April 14, 1970     D. H. BEATTIE     3,505,752

EAR TAG

Filed June 25, 1968

INVENTOR
DOUGLAS HAROLD BEATTIE

BY McGlew and Toren
ATTORNEYS

United States Patent Office 3,505,752
Patented Apr. 14, 1970

3,505,752
EAR TAG
Douglas Harold Beattie, "Haldon Downs," Inland Road,
Kaikoura, South Island, New Zealand
Filed June 25, 1968, Ser. No. 739,730
Claims priority, application New Zealand, June 26, 1967,
148,916
Int. Cl. G09f 3/00
U.S. Cl. 40—302                                              4 Claims

ABSTRACT OF THE DISCLOSURE

A plastic ear tag for livestock comprising a tag member having a hook portion at one end, and a resilient member attached to the tag member and carrying at a position intermediate its length an abutment which, in conjunction with the hook portion, is adapted to form a normally closed loop.

---

The invention relates to ear tags for livestock, and has for its object the provision of a plastic ear tag which can be fitted manually and is extremely difficult to dislodge in use.

According to the invention, a plastic ear tag comprises two substantially J-shaped limbs, one of which is adapted to lie against the inner surface of the ear with the bent portion of the limb engaging an aperture formed in the ear and the straight portion of the limb extending beyond the lower edge of the ear, and the other of which is adapted to lie against the outer surface of the ear with the bent portion of the limb engaging the lower edge of the ear and the straight portion of the limb extending across the aperture in the ear, the end of the bent portion of the first limb being connected to the straight portion of the second limb and the end of the bent portion of the second limb butting against the straight portion of the first limb.

Preferably, an abutment is formed on the straight portion of the first limb for the end of the bent portion of the second limb, whereby the lower edge of the ear, or the lower edge of the aperture in the ear, is prevented from slipping between the straight portion of the first limb and the end of the bent portion of the second limb.

Preferably, also, the straight portion of the first limb is bent adjacent the end of the bent portion of the second limb so as to increase the area of abutment between the end of the bent portion of the second limb and the straight portion of the first limb, and to facilitate insertion of the straight portion of the first limb into the aperture in the ear when fitting the ear tag.

A preferred embodiment of the invention will now be described, by way of example only, with reference to the accompanying drawings of which:

Figure 1:
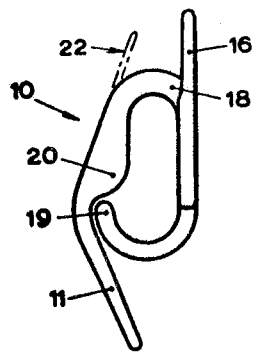
FIGURE 1 is a side elevation of an ear tag according to the invention.
Figure 2:
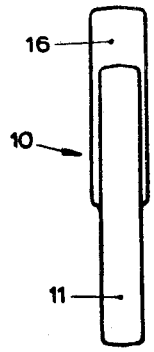
FIGURE 2 is a front elevation of the ear tag.
Figure 3:
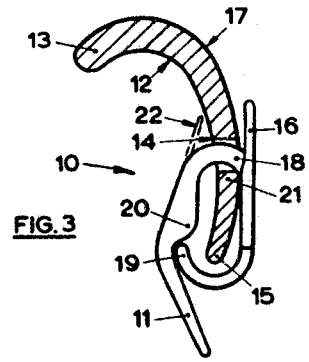
FIGURE 3 shows the ear tag in operation in its normal position.

Referring now to FIGURES 1 to 3 of the drawings, a plastic ear tag indicated generally at 10 has one substantially J-shaped limb 11 adapted to lie against the inner surface 12 of the ear 13 with the bent portion engaging an aperture 14 formed in the ear 13 and the straight portion extending beyond the lower edge 15 of the ear 13; and a second substantially J-shaped limb 16 adapted to lie against the outer surface 17 of the ear 13 with the bent portion engaging the lower edge 15 of the ear 13 and the straight portion extending across the aperture 14 in the ear 13; the end 18 of the bent portion of the first limb 11 being connected to the straight portion of the second limb 16, and the end 19 of the bent portion of the second limb 16 butting against the straight portion of the first limb 11.

An abutment 20 is formed on the straight portion of the first limb 11 for the end 19 of the bent portion of the second limb 16, whereby the lower edge 15 of the ear 13, or the lower edge 21 of the aperture 14 in the ear 13, is prevented from slipping between the straight portion of the first limb 11 and the end 19 of the bent portion of the second limb 16.

The straight portion of the first limb 11 is bent adjacent the end 19 of the bent portion of the second limb 16 so as to increase the area of abutment between the end 19 of the bent portion of the second limb 16 and the straight portion of the first limb 11, and to facilitate insertion of the straight portion of the first limb 11 into the aperture 14 in the ear 13 when fitting the ear tag 10; and the straight portion of the second limb 16 is made wider than the rest of the ear tag 10 so that relatively large identification numbers can be marked thereon.

In operation, the ear tag 10 is fitted, see FIGURE 3, by inserting the straight portion of the first limb 11 into the aperture 14 in the ear 13, pulling the two limbs 11 and 16 apart, and then pushing the ear tag 10 downwards until the lower edge 15 of the ear 13 passes between the abutment 20 formed on the straight portion of the first limb 11 and the end 19 of the bent portion of the second limb 16.

Figure 4:
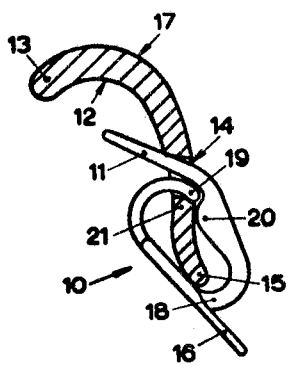
FIGURE 4 shows the ear tag in operation in a partly inverted position.
Figure 5:
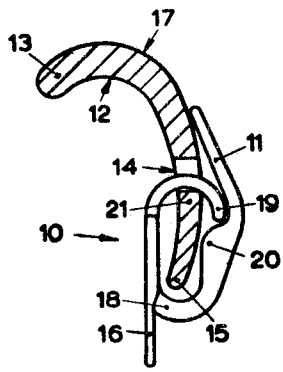
FIGURE 5 shows the ear tag in operation in a fully inverted position.

After the ear tag 10 has been fitted it may become partly inverted in use as shown in FIGURE 4, or be fully inverted manually as shown in FIGURE 5, the straight portion of the first limb 11 being sufficiently resilient to allow it to be pulled through the aperture 14 in the ear 13.

In both of the above positions, the configuration of the ear tag 10 is such that the lower edge 21 of the aperture 14 in the ear 13 is prevented from slipping between the straight portion of the first limb 11 and the end 19 of the bent portion of the second limb 16.

Identification numbers and the like may be stamped or otherwise permanently marked on the straight portion of the second limb 16 of the ear tag 10.

Alternatively or in addition, the ear tag 10 may be supplied in a variety of colours for identification purposes.

The ear tag 10 can be removed when required by pulling the two limbs 11 and 16 apart sufficiently to allow the ear tag 10 to slip off the ear 13.

If the ear tag 10 should be caught on a twig or the like, the bent portion of the second limb 16 is sufficiently resilient to release the twig if the ear tag 10 is positioned as shown in FIGURE 3, or to release the ear 13 if the ear tag 10 is positioned as shown in FIGURES 4 and 5, before the ear 13 is torn.

In a modification, the ear tag 10 is formed with a flexible tab indicated generally at 22 in FIGURES 1 and 3, so as to prevent movement of the ear tag 10 from its normal position as shown in FIGURE 3.

The plastic ear tag provided by the invention can be fitted manually and is extremely difficult to dislodge in use.

I claim:
1. A plastic ear tag comprising two substantially J-shaped limbs, one of which is adapted to lie against the inner surface of the ear with the bent portion of the limb engaging an aperture formed in the ear and the straight portion of the limb extending beyond the lower edge of the ear, and the other of which is adapted to lie against the outer surface of the ear with the bent portion of the limb engaging the lower edge of the ear and the straight portion of the limb extending across the aperture in the ear, the end of the bent portion of the first limb being connected to the straight portion of the second limb and the end of the bent portion of the second limb butting against the straight portion of the first limb.

2. A plastic ear tag according to claim 1, wherein an abutment is formed on the straight portion of the first limb for the end of the bent portion of the second limb, whereby the lower edge of the ear, or the lower edge of the aperture in the ear, is prevented from slipping between the straight portion of the first limb and the end of the bent portion of the second limb.

3. A plastic ear tag according to claim 2, wherein the straight portion of the first limb is bent adjacent the end of the bent portion of the second limb so as to increase the area of abutment between the end of the bent portion of the second limb and the straight portion of the first limb, and to facilitate insertion of the straight portion of the first limb into the aperture in the ear when fitting the ear tag.

4. A plastic ear tag according to claim 1, wherein the straight portion of the second limb is made wider than the rest of the ear tag so that relatively large identification numbers can be marked thereon.

References Cited

UNITED STATES PATENTS 1,312,248   8/1919   Giordano _____ 40—301

EUGENE R. CAPOZIO, Primary Examiner

W. H. GRIEB, Assistant Examiner